United States Patent [19]

Servat et al.

[11] Patent Number: 5,666,111

[45] Date of Patent: Sep. 9, 1997

[54] METHOD AND DEVICE FOR THE MONITORING AND GUIDANCE OF AN AIRCRAFT FOR PRECISION LANDING

[75] Inventors: Thierry Servat, Bordeaux; Jean-Luc Sicre, Fontenay aux Roses, both of France

[73] Assignee: Sextant Avionique, Velizy Villacoublay, France

[21] Appl. No.: 603,084

[22] Filed: Feb. 16, 1996

[30] Foreign Application Priority Data

Feb. 17, 1995 [FR] France .................. 95 01826

[51] Int. Cl.$^6$ .................................. G01C 21/00
[52] U.S. Cl. .................. 340/980; 340/974; 345/7
[58] Field of Search .................. 340/980, 979, 340/974, 976, 971, 973, 975, 961; 364/424.06, 428, 430; 345/7, 9

[56] References Cited

U.S. PATENT DOCUMENTS

| | | | |
|---|---|---|---|
| 3,967,799 | 7/1976 | Muller | 340/975 |
| 4,104,612 | 8/1978 | Lowe | 340/980 |
| 4,247,843 | 1/1981 | Miller et al. | |
| 4,368,517 | 1/1983 | Lovering | |
| 4,419,079 | 12/1983 | Georges et al. | 340/976 |
| 4,454,496 | 6/1984 | Lowe | 340/980 |
| 5,357,263 | 10/1994 | Fischer et al. | 340/975 |
| 5,406,489 | 4/1995 | Timothy et al. | 340/975 |

FOREIGN PATENT DOCUMENTS

| | | |
|---|---|---|
| 0 384 993 | 9/1990 | European Pat. Off. |
| 41 40 406 | 6/1993 | Germany. |

OTHER PUBLICATIONS

Patent Abstracts Of Japan, vol. 014 No. 235 (M–0975), May 18, 1990 & JP–A–02 060897 (Mitsubishi Heavy Ind Ltd), Mar. 1, 1990, abridged.

*Primary Examiner*—Brent A. Swarthout
*Attorney, Agent, or Firm*—Oblon, Spivak, McClelland, Maier & Neustadt, P.C.

[57] ABSTRACT

Disclosed is an improvement to the guidance, during the approach and landing stages, of aircraft operating in the categories 2 or 3A of the certification system used by recognized civilian organizations such as the DGAC, the FAA or the JAA, this improvement being designed to render the aircraft capable of working in the immediately lower category, namely the 3A or 3B category, at lower cost. The improvement consists of the addition of a head-up display visor HUD to the attitude heading reference system AHRS and to the air data computer ADC and of the displaying, on the head-up display visor HUD, of the flight path vector whose angular coordinates are drawn from information on east-west and north-south horizontal ground speed delivered by a global positioning receiver GPS according to the avionics standard furthermore used for the localization and navigation of the aircraft. This improvement has the advantage of enabling passage to the immediately lower certification category without requiring the on-board carriage of an inertial platform which is a device that is costly to purchase as well as to maintain.

7 Claims, 2 Drawing Sheets

METHOD AND DEVICE FOR THE MONITORING AND GUIDANCE OF AN AIRCRAFT FOR PRECISION LANDING

BACKGROUND OF THE INVENTION

1. Field of the Invention

The present invention pertains to an improvement made to the guidance, during the approach and landing stages, of aircraft operating in the categories 2 or 3A of the certification system used by recognized civilian organizations such as the DGAC, the FAA or the JAA, this improvement being designed to render the aircraft capable of working in the immediately lower category, namely the 3A or 3B category, at lower cost.

2. Description of the Prior Art aircraft operating in the categories 2 or 3A require the following conditions during the landing approach stage: a minimum vertical visibility or decision height DH of 50 feet and a minimum horizontal visibility or runway visual range RVR of 200 meters.

These limits of visibility required for operations in the categories 2 or 3A are adopted for aircraft equipped with an automatic pilot controlled by an air data computer or ADC giving the altitude and vertical speed and by an attitude heading reference system or AHRS without inertial platform, associated with a compass giving the longitudinal and transversal attitudes, the values of vertical and horizontal acceleration in all three axes and the magnetic heading.

In spite of very respectable performance characteristics, the 2 or 3A certification levels are not sufficient for certain airlines operating in countries with unfavorable weather conditions. This is because the requirement of meeting the minimum values of visibility laid down by these certification levels obliges them to reroute a considerable proportion of their flights and thus results in a substantial amount of lost business.

Consequently, there is a real need to change the category level of the equipment of an aircraft certified under category 2 or 3A to that of the certification category immediately below, namely 3A or 3B, in order to reduce the minimum levels of visibility and enable landing approaches under conditions of lower visibility.

One way of doing this is to replace the automatic pilot with another one that is certified under a lower category. This operation has the drawback of being costly for it means replacing an attitude heading reference system or AHRS having no inertial platform with an inertial reference system (IRS) type of system.

Another way of providing the requisite additional performance characteristics is to add a head-up display (HUD) visor to the guidance equipment of an aircraft with category 2 or 3A certification in order to form a hybrid system. This method of adding on equipment has the advantage wherein it can take the form of a upgrading kit that can be procured directly by the airline companies and integrated smoothly, without making any major modifications in the architecture of the existing system.

The requirements for category 3A and 3B certification of hybrid systems with head-up display visors are regulated by the certification authorities (especially the JAR AWO and AC 120-28C FAR groups). They entail new constraints, namely the need to have available primary reference information of higher quality and of a nature different from that strictly required under the already available category 2 or category 3A certification, hence information not necessarily available. This would be, for example, information on ground speed vector also called the flight path vector (FPV).

It is therefore necessary to propose a new source for the preparation of these information elements.

This problem is traditionally resolved by the incorporation of an IRS type unit or by an AHRS/IRS type upgrading, the latter approach involving a recertification of the automatic pilot. Although these approaches are technically satisfactory, their economic value is limited in view of the cost of purchasing and maintaining an inertial reference system.

Besides, it is increasingly being envisaged that aircraft should be equipped with satellite-based GPS (global positioning system) receivers in order to facilitate their localization and navigation. With this in view, an avionics standard (the TSO C 129cl standard) has recently been prepared. This standard sets the minimum characteristics required of a global positioning system GPS receiver on board an aircraft. This standard lays down that the global positioning system GPS receiver, in addition to giving positional coordinates of longitude, latitude and altitude, should also give the east-west and north-south horizontal speeds and the vertical speed of the carrier.

SUMMARY OF THE INVENTION

The aim of the invention is to propose an approach at lower cost, making it possible to meet the requirements of the airline companies that wish to lower their minimum operational requirements in the precision approach stage from the certified category 2 or 3A to the immediately lower category 3A or 3B by means of a hybrid system based on a low-cost attitude heading reference system or AHRS and a head-up display visor using, for the preparation of the flight path vector (FPV) to be displayed, the possibilities of a global positioning system GPS receiver according to the avionic standard, in avoiding the use of an inertial reference system.

An object of the invention is a method of monitoring and guiding aircraft for precision landing applied to an aircraft provided with an attitude heading reference system AHRS that is equipped with a compass and delivers, inter alia, the magnetic heading $\Psi_m$ and the vertical acceleration $a_z$, an air data computer ADC giving inter alia the barometric vertical speed $V_{zb}$, a global positioning system GPS receiver complying with the avionics standard and delivering, in addition to the positional coordinates of latitude, longitude and altitude, the east-west and north-south horizontal speeds $V_{EO}$ and $V_{NS}$, and a head-up display visor on which there is displayed an artificial skyline and the flight path vector (FPV). This method consists in locating the end of the flight path vector (FPV) on the head-up display visor by means of two angular coordinates, one of them being the vertical flight path angle (FPA) referenced with respect to the artificial skyline and derived from the relationship:

$$FPA = \text{Arc tan} \frac{V_{zBI}}{\sqrt{V_{EO}^2 + V_{NS}^2}}$$

where $V_{zBI}$ is the baro-inertial vertical speed resulting from hybridization between the barometric vertical speed $V_{zB}$ delivered by the air data computer ADC and the vertical acceleration $a_z$ delivered by the attitude heading reference system or AHRS, the other angular coordinate being the horizontal course angle $\Delta$ referenced with respect to the vertical median of the screen of the head-up display visor symbolizing the median longitudinal vertical plane of symmetry of the aircraft and derived from the relationship:

$$\Delta = -\Psi_m + \text{Arc tan}\frac{V_{EO}}{V_{NS}} - decl$$

where decl is the magnetic declination.

An object of the invention is also a device for the monitoring and guidance of aircraft implementing the above-mentioned method and comprising an attitude heading reference system AHRS that is equipped with a compass and delivers, inter alia, the magnetic heading $\Psi_m$ and the vertical acceleration $a_z$, an air data computer ADC giving inter alia the barometric vertical speed $V_{zb}$, a global positioning system GPS receiver complying with the avionics standard and delivering, in addition to the positional coordinates of latitude, longitude and altitude, the east-west and north-south horizontal speeds $V_{EO}$ and $V_{NS}$, a head-up display visor on which there is displayed an artificial skyline and the flight path vector (FPV) and a head-up display visor computer equipped with:

means to compute the vertical flight path angle (FPA) of the end of the flight path vector FPV with respect to the artificial skyline by means of the relationship:

$$FPA = \text{Arc tan}\frac{V_{zBI}}{\sqrt{V_{EO}^2 + V_{NS}^2}}$$

where $V_{zBI}$ is the baro-inertial vertical speed resulting from hybridization between the barometric vertical speed $V_{zB}$ delivered by the air data computer ADC and the vertical acceleration $a_z$ delivered by the attitude heading reference system AHRS, means to compute the horizontal angular coordinate constituted by the horizontal course angle Δ of the end of the ground speed vector or flight path vector FPV referenced with respect to the vertical median of the screen of the head-up display visor symbolizing the median longitudinal vertical plane of symmetry of the aircraft by means of the relationship:

$$\Delta = -\Psi_m + \text{Arc tan}\frac{V_{EO}}{V_{NS}} - decl$$

where decl is the magnetic declination.

Advantageously, the device further comprises a remote magnetic compensator unit RMCU that operates on the compass and enables the measurement of the magnetic heading to be made more precise by correcting the influence of the magnetic masses of the aircraft.

Advantageously, the global positioning system GPS receiver also delivers an information element on the vertical speed of the aircraft that is compared with the information on the vertical speed of the aircraft deduced from measurements made by the attitude heading reference system or AHRS and by the air data computer ADC to perform checks on operation.

Advantageously, the global positioning system GPS receiver is provided with an integrity checking device making it possible to ensure that it is available for use both in the flight preparation stage and at the beginning of an approach for a landing.

BRIEF DESCRIPTION OF THE DRAWINGS

Other characteristics and advantages of the invention shall emerge from the description of an embodiment given by way of an example. This description shall be given here below with reference to the appended drawings, wherein.

MORE DETAILED DESCRIPTION

Figure 1:
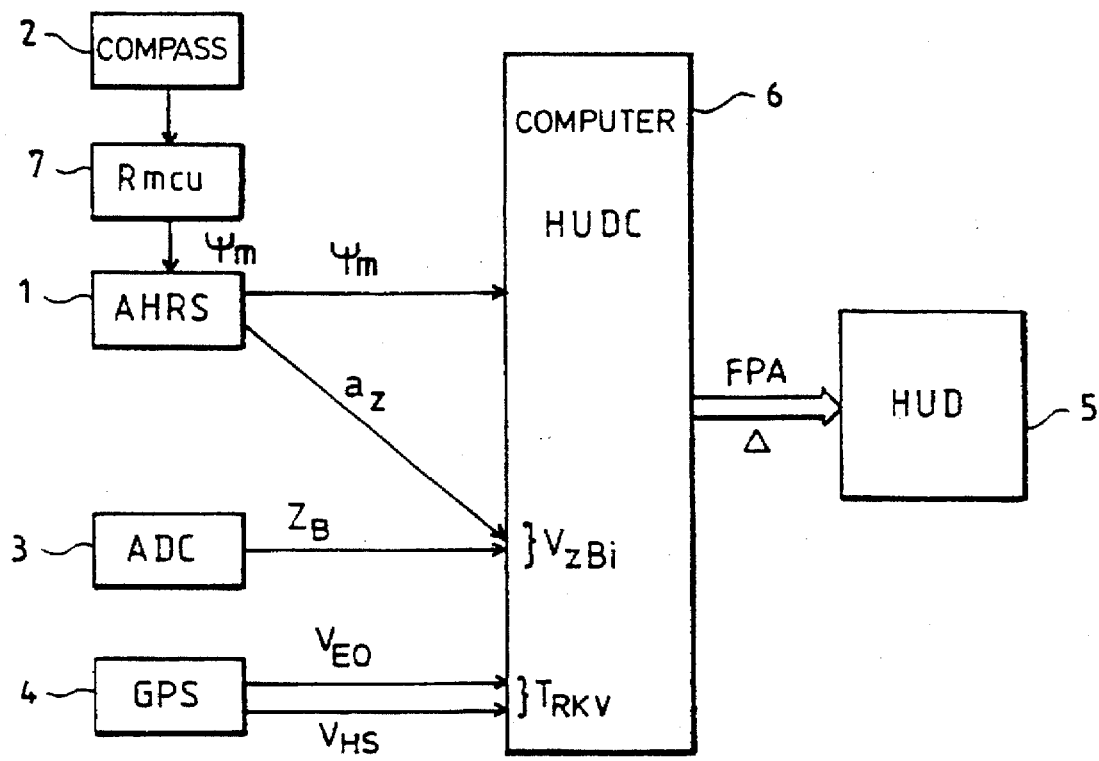
FIG. 1 shows a schematic diagram of an aircraft guidance device according to the invention.

FIG. 1 shows a hybrid guidance system for aircraft based on an automatic pilot and a head-up display visor making it possible, at low cost, to go from certification level 2 or 2A to the immediately lower certification level 3A or 3B. There are two types of guidance instruments: a first type comprising pre-existing instruments that form the basic equipment of an aircraft meeting certification level 2 or 3A and a second type comprising instruments that are added on in order to obtain the change to the immediately lower certification level 3A or 3B.

The pre-existing instruments constituting the basic equipment of an aircraft at the certification level 2 or 3A are the attitude heading reference system or AHRS 1 without inertial guidance platform, the compass 2 and the air data computer 3.

The attitude heading reference system or AHRS 1 is a low-cost instrument as compared with an inertial reference system IRS and gives indications of attitude and heading and the vertical acceleration.

The compass 2 gives the magnetic heading to the attitude heading reference system AHRS 1.

The air data computer ADC 3 gives indications on altitude and vertical speed.

The instruments added on to obtain the change to the immediately lower certification level are a global positioning system GPS receiver 4 according to the avionics standard, a head-up display visor HUD 5 and its computer HUDC 6 and a remote magnetic compensator unit RMCU 7.

The justification for the global positioning system GPS receiver 4 lies in the fact that it provides great facility in the localization and hence in the navigation of a modern aircraft. There can be no doubt that, in the medium or short term, it will form part of the basic navigation equipment of a modern aircraft. Furthermore, as of now, there is an avionics standard for global positioning system GPS receivers (namely the TSO C 129cl standard). In addition to the position in terms of latitude, longitude and altitude, the global positioning system GPS receiver gives the vertical speed and the east-west and north-south horizontal speeds. It gives these information elements on an ARINC 429 type multiple-receiver medium so that it is not necessary to provide it with a specific output whenever it is planned to give it a new use.

Figure 2:
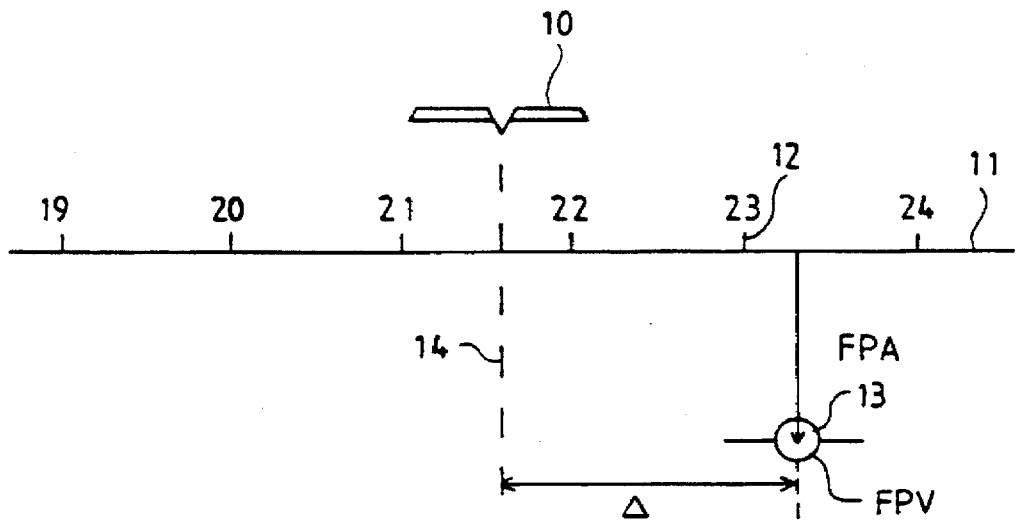
FIG. 2 illustrates the main symbols that appear on the screen of a head-up display unit.

The head-up display visor 5 is of a standard type. It is formed by a semi-transparent plate through which the pilot sees the outside scene and a system of projection enabling the display of the symbols on the semi-transparent plate so that they are seen by the pilot as being superimposed on the outside scene. As can be seen in FIG. 2, the main symbols displayed are an aircraft model 10, an artificial skyline 11 graduated in a heading scale 12 and a reticle 13 indicating the position of the flight path vector FPV in the form of a small winged circle.

The model aircraft 10 is fixed and placed on the longitudinal reference of the aircraft in the vertical longitudinal plane of symmetry of the aircraft. Working in coordination with the heading scale 12, which moves along the artificial skyline 11 as a function of the heading followed, it enables the heading to be assessed.

The artificial skyline 11 moves according to the indications from the navigation system so as to coincide with the skyline. In coordination with the aircraft model 10, it enables a rough assessment to be made of the longitudinal and lateral attitudes of the aircraft.

The reticle 13 in the shape of a small winged circle that represents the position of the end of the flight path vector FPV in terms of course angle and flight path angle is mobile on the screen of the head-up display visor. The position of this reticle 13, in terms of height above or below the artificial skyline 11, depends on a flight path angle FPA. Its lateral divergence from the median of the head-up visor that goes through the aircraft model 10 depends on a course angle $\Delta$. These two angles are determined by the computer 6 of the head-up display visor.

The computer 6 of the head-up display visor HUD determines the position of the artificial skyline 11 and of the heading scale with which it is graduated on the basis of information on the longitudinal and lateral attitudes of the aircraft. This information is given by the attitude heading reference system AHRS 1. It also determines the position of the reticle 13 identifying the end of the flight path vector. To do this, it computes the flight path angle FPA and the course angle $\Delta$ of the flight path vector FPV.

To compute the flight path angle of the flight path vector, it works on the basis of the baro-inertial vertical speed $V_{zBI}$ and the horizontal east-west and north-south speeds $V_{EO}$ and $V_{NS}$ by implementing the relationship:

$$FPA = \text{Arc tan} \frac{V_{zBI}}{\sqrt{V_{EO}^2 + V_{NS}^2}} \quad (1)$$

The baro-inertial vertical speed $V_{sBI}$ is obtained conventionally by the hybridization of the pressure altitude $Z_B$ given by the air data computer 3 and the vertical acceleration $a_z$ given by the attitude heading reference system AHRS 1. This hybridization consists in integrating the vertical acceleration $a_z$ in order to deduce a vertical inertial speed $V_1$ therefrom and combining this vertical inertial speed with the information on pressure altitude $Z_B$. The east-west and north-south horizontal speeds $V_{EO}$ and $V_{NS}$ are given by the global positioning system GPS receiver according to the avionics standard.

The relationship (1) highlights the fact that the tangent of the flight path angle FPA with the flight path vector FPV with respect to the horizontal plane represented by the artificial skyline 11 is equal to the ratio of the vertical component $V_{zBI}$ to the horizontal component $$\sqrt{V_{EO}^2 + V_{NS}^2}$$

of the flight path vector FPV.

To compute the course angle $\Delta$ of the flight path vector FPV, the computer 6 of the head-up display visor operates on the basis of the magnetic course $\Psi_m$ given by the attitude heading reference system AHRS 1, the true course angle with respect to geographic north $\text{Arctan} V_{EO}/V_{NS}$ deduced from the horizontal ground speeds $V_{EO}$ and $V_{NS}$ delivered by the global positioning system GPS receiver 4 and a magnetic declination decl taken from a table addressed by means of the localization done by the global positioning system GPS receiver 4, by the implementation of the relationship:

$$\Delta = -\Psi_m + \text{Arc tan} \frac{V_{EO}}{V_{NS}} - decl$$

Figure 3:
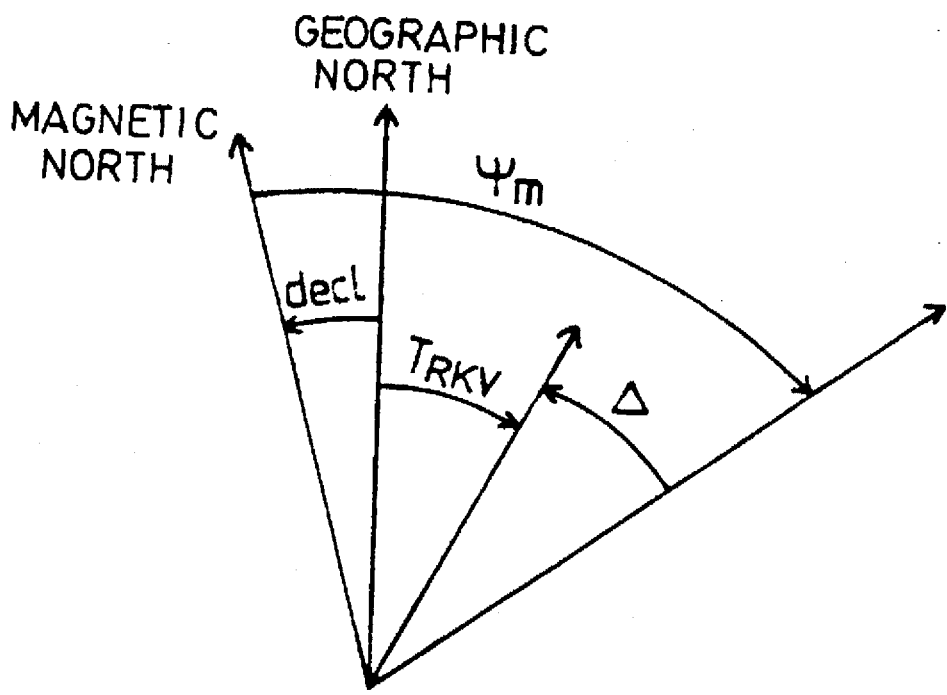
FIG. 3 is a diagram illustrating the way to obtain the course angle coordinate of the end of the flight path vector FPV.

Indeed, the course angle of the flight path vector FPV with respect to geographic north $T_{RKv}$ is given by the value of the arc tangent of the ratio of the east-west horizontal speed $V_{EO}$ to the north-south horizontal speed $V_{NS}$ given by the global positioning system GPS receiver 4. It is necessary to deduce therefrom the course angle $\Delta$ with respect to the vertical median of the screen of the head-up display visor that passes through the aircraft model 10, i.e. with respect to the horizontal fuselage referenced HFR of the aircraft. As shown in FIG. 3, this consists of the subtraction, from the course angle $T_{RKv}$, referenced in relation to the geographic north, of the heading angle $\Psi_m$ referenced in relation to the magnetic north and the magnetic declination decl counted positively eastward.

To obtain a degree of overall precision that meets the levels required for category 3A or 3B operations, a precise table of magnetic declination and an information element on compensated magnetic heading $\Psi_m$ are used. The requisite reference in this table of magnetic declination is determined through the localization obtained by the global positioning system GPS receiver 4. The information element on magnetic heading $\Psi_m$ is compensated for by means of a remote magnetic compensator unit or RMCU 7 with which the compass is fitted out.

The requisite security level is achieved by making use of redundancies existing between the information elements given by the attitude heading reference system AHRS 1, the air data computer ADC 3 and the global positioning system GPS receiver 4, in particular, the information on vertical speed delivered by both global positioning system GPS receiver 4 and the attitude heading reference system AHRS and by using the global positioning system GPS receiver equipped with RAIM (Receiver Autonomous Integrity Monitoring) enabling a checking of integrity, a prediction of availability or integrity of the global positioning system GPS information elements in the flight preparation stage and a confirmation of the availability or integrity of the global positioning system GPS information elements at the beginning of the approach to a landing area.

Naturally, the present invention is not limited to the embodiment described and represented but may have numerous variants that are accessible to those skilled in the art without departing from the spirit of the invention.

What is claimed is:

1. A method of monitoring and guiding aircraft for precision landing applied to an aircraft provided with an attitude heading reference system AHRS that is equipped with a compass and delivers, inter alia, the magnetic heading $\Psi_m$ and the vertical acceleration $a_z$, an air data computer ADC giving inter alia the pressure altitude $Z_B$, a global positioning system GPS receiver complying with a standard setting forth minimum required characteristics and delivering, in addition to the positional coordinates of latitude, longitude and altitude, the east-west and north-south horizontal speeds $V_{EO}$ and $V_{NS}$, and a head-up display visor on which there is displayed an artificial skyline and the flight path vector FPV, said method consisting in locating the end of the flight path vector FPV on the head-up display visor by means of two angular coordinates, one of them being the vertical flight path angle FPA referenced with respect to the artificial skyline and derived from the relationship:

$$FPA = \text{Arc tan} \frac{V_{zBI}}{\sqrt{V_{EO}^2 + V_{NS}^2}}$$

where $V_{zBI}$ is the baro-inertial vertical speed resulting from hybridization between the pressure altitude $Z_B$ delivered by the air data computer ADC and the vertical acceleration $a_z$ delivered by the attitude heading reference system AHRS, the other angular coordinate being the horizontal course angle $\Delta$ referenced with respect to the vertical median of the screen of the head-up display visor symbolizing the longitudinal vertical plane of symmetry of the aircraft and derived from the relationship:

$$\Delta = -\Psi_m + \text{Arc tan} \frac{V_{EO}}{V_{NS}} - decl$$

where decl is the magnetic declination.

2. A method according to claim 1, wherein the magnetic declination is taken from a magnetic declination table in which the requisite value is identified by means of the localization given by the global positioning system GPS receiver.

3. A method according to claim 1, applied to an aircraft provided with a global positioning system GPS receiver delivering an information element on vertical speed, wherein the integrity of the equipment is tested by a comparison of the information on vertical speed delivered by the attitude heading reference system AHRS associated with the air data computer ADC and by the global positioning system GPS.

4. A device for the monitoring and guidance of aircraft comprising an attitude heading reference system AHRS that is equipped with a compass and delivers, inter alia, the magnetic heading $\Psi_m$ and the vertical acceleration $a_z$, an air data computer ADC giving inter alia the pressure altitude $Z_B$, a global positioning system GPS receiver complying with a standard setting forth minimum required characteristics and delivering, in addition to the positional coordinates of latitude, longitude and altitude, the east-west and north-south horizontal speeds $V_{EO}$ and $V_{NS}$, a head-up display visor on which there is displayed an artificial skyline and the flight path vector FPV and a head-up display visor computer equipped with:

means to compute the vertical flight path angle FPA of the end of the flight path vector FPV with respect to the artificial skyline by means of the relationship:

$$FPA = \text{Arc tan} \frac{V_{zBI}}{\sqrt{V_{EO}^2 + V_{NS}^2}}$$

where $V_{zBI}$ is the baro-inertial vertical speed resulting from hybridization between the pressure altitude $Z_B$ delivered by the air data computer ADC and the vertical acceleration $a_z$ delivered by the attitude heading reference system AHRS, means to compute the horizontal angular coordinate constituted by the horizontal course angle $\Delta$ of the end of the flight path vector FPV referenced with respect to the vertical median of the screen of the head-up display visor symbolizing the longitudinal vertical plane of symmetry of the aircraft by means of the relationship:

$$\Delta = -\Psi_m + \text{Arc tan} \frac{V_{EO}}{V_{NS}} - decl$$

where decl is the magnetic declination.

5. A device according to claim 4, further comprising a remote magnetic compensator unit RMCU correcting the error of the compass induced by the influence of the magnetic masses of the aircraft.

6. A device according to claim 4, wherein the global positioning system GPS receiver is provided with an integrity checking device.

7. A device according to claim 4, provided with a global positioning system GPS receiver delivering an information element on vertical speed, said device furthermore comprising means to compare the information elements on vertical speed delivered by the global positioning system GPS receiver and by the attitude heading reference system AHRS associated with the air data computer ADC and the compass testing the integrity of the equipment.

* * * * *